UNITED STATES PATENT OFFICE.

PAUL R. HERSHMAN, OF CHICAGO, ILLINOIS, ASSIGNOR TO THE MINERAL PRODUCTS COMPANY, OF NEW YORK, N. Y., A CORPORATION OF WEST VIRGINIA.

METHOD OF MAKING ALKALI-SOLUBLE ALUMINA.

1,137,617.

Specification of Letters Patent. Patented Apr. 27, 1915.

No Drawing. Application filed October 29, 1914. Serial No. 869,203.

*To all whom it may concern:*

Be it known that I, PAUL R. HERSHMAN, a subject of the Emperor of Austria-Hungary, residing at and whose post-office address is Chicago, county of Cook, State of Illinois, have invented certain new and useful Improvements in Methods of Making Alkali-Soluble Alumina; and I do hereby declare the following to be a full, clear, and exact description of the invention, such as will enable others skilled in the art to which it appertains to make and use the same.

The present invention relates to the treatment of calcined alunite, alum rock, alum stone and the like, for the purpose of converting the alumina into a condition which renders it soluble in alkali.

The present invention is based upon the discovery that by heating calcined alunite to a suitable temperature in admixture with carbon, (for instance, powdered coal, powdered coke, lamp black, or the like,) the calcined alunite will be converted into a condition in which it will be partly or wholly soluble in alkali. For instance, the alumina, mixed with 20% to 50% of carbon, and treated in a current of a gas which will not consume the carbon, (as, for instance, nitrogen, or carbon monoxid) or which will not materially consume the carbon (as, for instance, producer gas) begins to become soluble at about 1450° C. At about 1550° C., say 50% of the alumina becomes soluble, and at about 1650° C. the solubility is substantially complete. Conducting the operation in a current of air or in a current of carbon dioxid gives lower results, particularly if no precautions are taken to compensate for any accompanying consumption of the carbon in the charge. Accordingly, where any such carbon-consuming gas is employed the charge should contain a sufficient excess of carbon to compensate for that which is consumed.

The heating operation is to be maintained for a period ranging from ½ to 2 hours according to the quantity treated and the available facilities for bringing the entire mass to the desired maximum degree of heat. The termination of the operation may be established, for instance, by taking test samples from the charge until a test sample is obtained which will dissolve in boiling alkali. It is found that heating the mixture of alumina and carbon at the high range of temperature indicated usually results in the conversion of some portion of the alumina into aluminum carbid, and that with further increase of temperature the relative proportion of carbid to oxid increases. Not only the alumina, but also the aluminum carbid produced, are found to enter into solution in heated or boiling alkali. Accordingly, the product containing the alkali-soluble aluminum oxid and the aluminum carbids is dissolved by heating the product (preferably to the boiling point) in a solution of sodium hydroxid, say in the proportion of 1½ to 2 parts by weight of actual sodium hydroxid to one part by weight of aluminum oxid, or one part by weight of aluminum carbid, calculated to the oxid. The heating operation is facilitated by pressure. The alumina may then be recovered from the solution in a pure state by the well-known Bayer process or any other suitable process adapted for the purpose as will be well understood by those skilled in the art.

While the practice of the invention is not restricted to the use of any particular apparatus, it will be found convenient to conduct the operation in the usual inclined rotatory kiln.

It will be understood that before subjecting the calcined alunite to the treatment herein proposed, it will be desirable to recover from it the potash salts, either by leaching as described in U. S. Patent issued to Howard F. Chappell, No. 1,070,324, under date of August 12, 1913, or by volatilization as described in a pending application of Charles H. MacDowell, Serial No. 854,278, filed July 3, 1914. It is not commercially feasible, however, to absolutely remove the alkali salts in their entirety from the calcined alunite by leaching, or even by volatilization at the low temperatures employed for that purpose and it will be understood therefore that at the beginning of the present operation some traces of alkali will be present in the charge which may range as high at 2.5% of the weight of the charge.

The presence of the residual alkali in the calcined alunite apparently tends to improve the efficiency of the operation, inasmuch as calcined alunite is very readily rendered soluble by the treatment proposed. I may say, however, that in so far as I am aware, the process described is new in its application to alumina from whatever source produced and I therefore desire that the invention should have a correspondingly comprehensive interpretation.

What I claim is:

1. The method of treating alumina, which consists in heating it in admixture with carbon up to a temperature sufficient to leave it soluble in alkali mainly as oxid.

2. The method of treating alumina, which consists in heating it, in admixture with carbon, and in the presence of a protective gas, up to a temperature sufficient to leave it soluble in alkali, mainly as oxid.

3. The method of treating alumina, which consists in heating it, in admixture with carbon, and in the presence of a non-nitrifying atmosphere, to a temperature sufficient to make it soluble in alkali.

4. The method of treating alunite and the like, which consists in calcining it, and thereafter heating it, in admixture with carbon up to a temperature sufficient to leave it soluble in alkali mainly as oxid.

5. The method of treating alunite, which consists in calcining it, and thereafter heating it, in admixture with carbon, and in the presence of a protective gas, up to a temperature sufficient to leave it soluble in alkali, mainly as oxid.

6. The method of treating alunite, which consists in calcining it, and thereafter heating it, in admixture with carbon, and in the presence of a non-nitrifying atmosphere, to a temperature sufficient to make it soluble in alkali.

In testimony whereof I affix my signature, in presence of two witnesses.

PAUL R. HERSHMAN.

Witnesses:
O. LANGE, Jr.,
W. C. KIRK.